May 1, 1923. 1,453,851
S. S. McGRATH
ROTARY KILN
Filed March 30, 1921
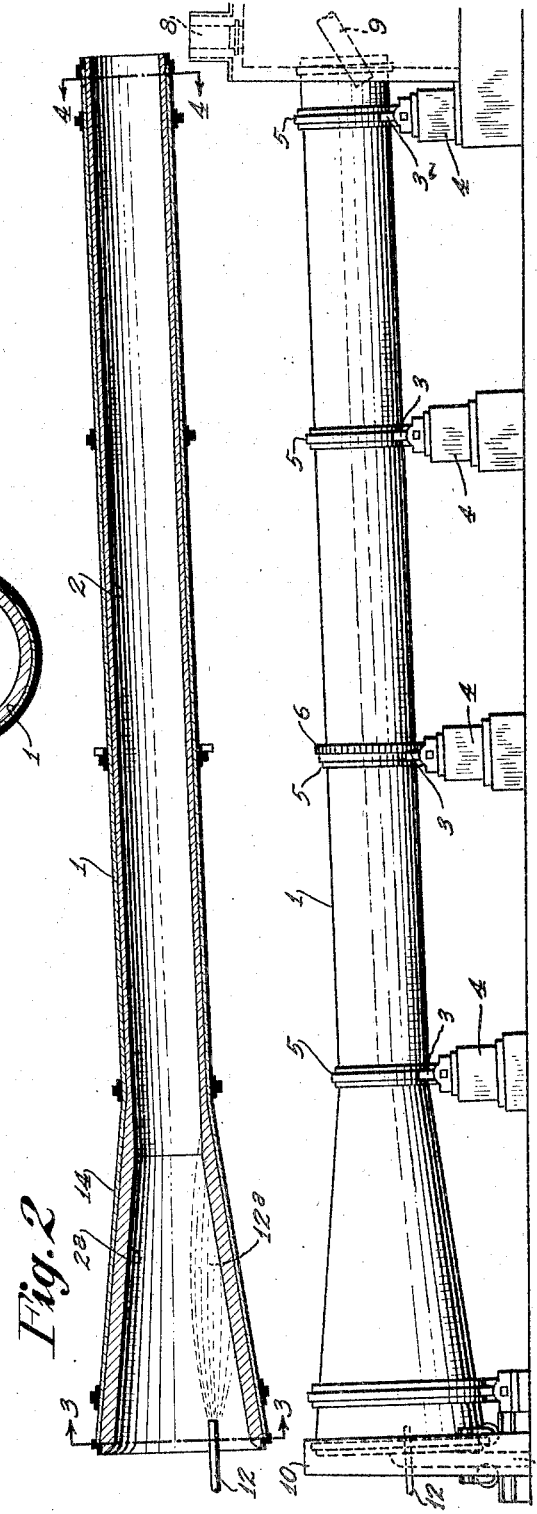
INVENTOR
Sylvester S. McGrath
BY Jas. H. Griffin
ATTORNEY Patented May 1, 1923.

1,453,851

UNITED STATES PATENT OFFICE.

SYLVESTER S. McGRATH, OF WEST NEW BRIGHTON, NEW YORK.

ROTARY KILN.

Application filed March 30, 1921. Serial No. 456,886.

*To all whom it may concern:*

Be it known that I, SYLVESTER S. Mc-GRATH, a citizen of the United States, residing at West New Brighton, borough of Richmond, in the county of Richmond and State of New York, have invented a certain new and useful Rotary Kiln, of which the following is a specification.

This invention relates to rotary kilns for roasting, calcining limes and plasters or for other analogous uses, but is particularly adapted for the production of hydraulic or Portland cement clinker.

According to the best authorities, hydraulic or Portland cement is the product obtained by an intimate and properly proportioned mixture of argillaceous and calcareous materials, which produces a clinker when calcined to incipient fusion, and there calcination should cease, and the clinkered product removed as soon as possible.

The general method now used for producing hydraulic cement clinker is to pass a mixture of materials to be calcined through long rotating refractory lined metallic cylinders or horizontal tubular kilns of uniform interior diameter throughout their entire length. These kilns, are, in practice, slightly inclined and are mounted on trunnions for rotation by any suitable power. A hood, provided with a discharge opening, is associated with the lower end of the kiln and within the hood is positioned burning apparatus adapted to inject a flame into the kiln to act upon the material passing therethrough. The upper end of the kiln is provided with a stack to allow of the escape of the gases produced by combustion and chemical decomposition and means is also associated with the upper end of the kiln for supplying a mixture or materials to be calcined, or clinkered to the retort.

In the well known process of making hydraulic cement, the unburnt material is fed into the upper end of a rotary kiln of the character specified, at its upper end, and travels along the inclined invert of the refractory lined tubular kiln, in a thick layer, which is continually turned over by the rotary motion of the kiln, and is dried, and the dioxid gases driven off, as the heat from the lower end comes in contact with it, this is in the drying or low temperature zone. As the material progresses, it enters the sintering or calcining zone, where the heat is some degrees higher, and which causes the particles of pulverulent materials, to collect and form a viscous mass, which has a tendency to adhere, and accumulate upon the sides of the kiln and forms an obstruction, or ring formation, which chokes up the kiln, and retards the progress of the materials, as they leave the sintering and enter the burning zone, and at this point become an incandescent mass, which as it falls into the burning zone, or highest temperature zone, has a tendency to become overburnt. The ring formation also has a tendency to injure the refractory lining of the kiln, and cause it to spall and fall out of place, and when it becomes so large, as to almost stop all further progress of the materials, the kiln must be stopped in its operation, and allowed to become cooled, and the obstruction or ring formation, removed by manual labor.

With the foregoing considerations in mind, the object of the present invention is to provide a kiln of the character specified, which will be more efficient, economical, reliable and rapid in its operation of producing cement clinker and kilns of the construction specified, and which may be operated with greater capacity than kilns of the character referred to.

In carrying out the present invention in one of its preferred forms, the kiln is constructed in the form of a rotating cylindrical drum provided with a refractory lining. The kiln is mounted for rotation on an inclined axis and associated with its opposite ends are a hood and stack as heretofore. Means is associated with the stack end of the kiln for introducing material into the kiln and a burner is associated with the hood or lower end of the kiln. During the operation of the kiln, the interior of the length thereof is theoretically divided into three zones, namely, a drying zone adjacent the feed or upper end of the kiln, an adjacent calcining or sintering zone, and a burning or clinkering zone, which occupies the lower or outlet end of the kiln. The kiln is so constructed that it is of substantially the same cross sectional area for the greater portion of its length and through that part of the kiln constituting the drying and calcining zones, while the portion of the kiln which constitutes the burning or clinkering zone has an interior configuration substantially in the form of a truncated cone. In other words, the inner surface of the kiln at the exit end thereof diverges from the adjacent calcining zone with a pronounced taper, so that the outlet end of the kiln, constituting the burning zone, flares outwardly to an increased diameter at its outlet end. As a result of this construction, the unburnt materials in passing through the drying zone and into and through the calcining zone, which zones are of uniform diameter, come to a point of calcination and incipient fusion in the burning zone, and starts to accumulate and form clinker balls at about the time the material advances well into the burning zone. As the material passes into the burning zone and proceeds to form into clinker balls, it simultaneously passes from the relatively restricted cross sectional area of the calcining zone into the gradually enlarging or diverging space within the burning zone. Since the path of travel of the burning material is constantly enlarging as the material proceeds, this rapidity of flow of movement will increase and there will thereafter be less opportunity for the viscous mass of material to adhere to the sides of the kiln and choke the bore thereof. As the newly formed calcined product falls forward, or rolls into the gradually enlarging and revolving greater space, it takes on a fan shape form or mass upon the invert of the truncated cone shaped burning zone, where the flame of the burning apparatus impinges directly upon the rapidly moving mass of material at a point on the invert immediately forward and below the outlet of the calcining zone. By providing the tapering or diverging walls in the burning zone, I am enabled to effect a great economy of fuel, as less heat units are required to calcine cement making material and cause it to clinker when the flame impinges directly upon a moving mass of material as it passes through the burning zone.

Another feature of the invention consists in providing a retort of the character specified wherein the refractory lining of the burning zone is made thicker and heavier than the other zones, so as to withstand the heat required for the burning operation at this point while not unduly increasing the weight of the kiln at other points which are required to withstand a lower temperature of heat.

Features of the invention, other than those specified, will be apparent from the hereinafter detailed description and claims, when read in conjunction with the accompanying drawings.

The accompanying drawings illustrate one practical embodiment of the present invention, but the construction therein shown is to be understood as illustrative, only, and not as defining the limits of the invention.

Figure 1 is a side elevation of a kiln embodying the present invention.

Figure 2 is a central section through the rotary kiln portion of the kiln.

Figure 3 is a section on the line 3—3 of Figure 2; and.

Figure 4 is a section on the line 4—4 of Figure 2.

In the accompanying drawings, the kiln is shown in the form of a shell 1, which, in practice, may be constructed in any desired manner, such as by building up the kiln of metallic sections and providing the same with a refractory lining 2. The kiln is mounted for rotation on an inclined axis on a plurality of rollers 3, supported on suitable pillows 4 and operating upon bands 5 secured circumferentially of the kiln. In practice, rotation may be conveniently imparted to the kiln by associating an annular gear with one of the bands 5 and driving such gear from any suitable power mechanism.

Associated with the upper or inlet end of the kiln is a housing 7 into which the products of combustion and gases due to chemical decomposition flow from the kiln during the operation thereof and may be lead off through the stack 8. Suitable feed mechanism 9 is also associated with the inlet end of the kiln and serves to introduce the material to be operated upon into said kiln.

The lower end of the kiln has associated therewith a hood 10 providing an outlet passage 11 for the treated materials and with which hood is associated burning apparatus 12. The hood may be of any conventional kind and may be associated with the kiln in any well known desired way. The hood per se forms no part of the present invention, nor does the feeding mechanism, outlet chamber 7 or the stack 8.

The invention as hereinbefore stated is directed to the kiln and its lining and has more particularly to do with the shaping of the kiln in the manner next to be described.

When the kiln is operated to produce cement clinker, the interior of the kiln theoretically divides it into three distinct zones, namely, the drying zone, the calcining zone and the burning zone, through which zones material successively passes during its travel from the inlet to the outlet end of the kiln.

Material is fed into the upper end of the kiln through the feeding mechanism 9 and is caused to roll and fall down the kiln by the revolving of the latter. During its passage through the retort, such material is heated by any of the usual methods; preferably by injecting gas, oil or powdered coal through the pipe 12 into the kiln under air pressure and causing such fuel to burn in a flame 12ª. The head of this flame passes up the kiln and through the stack 8, gradually decreasing in temperature during passage through the kiln, thus material entering the upper end of the retort is subjected to increasing heat. The heat to which the material is first subjected is the lowest degree of heat within the kiln and serves merely to dry the material as it passes for a portion of the length of the kiln and through the so called drying zone. As the material proceeds the heat becomes higher and continues to increase as the material passes through the calcining zone where it is brought to a point of calcination, so that by the time it leaves the calcining zone, and enters the burning zone, it is in a condition to be directly acted upon by the flame 12ª, transformed into a viscous character and fused or burnt through the direct action of the flame 12ª thereon.

In kilns heretofore used, such kilns have invariably been constructed with a uniform interior diameter throughout their length and when thus formed, it is found that at the point where the material begins to partake of the viscous form, such material tends to stick or adhere to the wall of the kiln and in time cause a ring or annular barrier to collect at a point just beyond the flame. As the kiln continues to operate, the material is held back by the ring thus formed and choked so that it becomes necessary to remove the ring before the kiln can properly function. This necessitates the stopping of the apparatus, the permitting of it to stand idle for some time while it cools, and thereafter workmen are sent into the kiln to chop out the ring thus formed.

In the present invention, I entirely overcome this disadvantage and incident waste in time and labor by forming the lower outlet end of the kiln of frusto conical shape, which shape is extended along the kiln, so as to preferably enclose the entire burning zone and slightly beyond the same. This portion of the kiln is designated by the reference character 14 and it will appear from the drawings that it extends from the calcining zone in with flaring or diverging walls to the lower end of the kiln. In practice, I preferably provide this frusto conical or tapered portion of the kiln with a refractory material 2ª, which, as shown, is thicker than the lining 2 throughout the remainder of the kiln and it is at this part of the kiln that the greatest heat is present. That part of the kiln between the charging end and the frusto conical tapered portion 14 is preferably made of uniform interior diameter as clearly shown in Figure 2 of the drawings.

The formation of the kiln with a tapering burning zone of substantially frusto conical character as described, and the application of the burning flame 12ª, so that it will impinge the tapering wall of such burning zone, constitute the essence of this invention, since through the incorporation of these features in kiln construction, the kiln is enabled to function more efficiently and rapidly in the production of cement clinker. This will be apparent to those skilled in the art from the operation of the device next to be described.

The material after passing through the drying zone and into the calcining zone, becomes highly heated so that by the time it enters the burning zone, it is in a condition to be readily transformed by the flame into a viscous substance. However, before this occurs, the material is engaged with the tapering walls of the portion 14 and its speed is accelerated as it passes into the flame. Moreover, the flow of material is broadened out through its passage through the part 14, so that it takes on a fan shaped form or mass upon the invert of the truncated cone of the burning zone, where the flame from the burning apparatus impinges directly upon the moving mass of material and effects a burning or fusion of the same. During this operation, the tapering walls of the burning zone keep the mass of material in motion, so that it cannot come to rest and adhere to the lining of the kiln. Moreover, as the speed of movement of the material is increased during its passage through the burning zone, there is no tendency of the material to back up and form a ring as hereinbefore described and accordingly the material may be fed faster from the feeding apparatus 9 than has heretofore been possible. As the flame strikes the thickened portion 2ª of the lining, it is less liable to injure the lining or shell than though a thin lining were provided throughout the entire kiln. Accordingly, the flame may impinge the lining without damaging the same and thus enables the material to be moved faster through the kiln since a greater heat may be applied in the burning zone. It is found that by moving the material through the kiln more rapidly than heretofore, the capacity of the apparatus is not only increased, but the material is more uniformly operated upon, both for test and soundness, the product being neither overburnt nor underburnt, since the material is not held up in its movement through the kiln by obstructions which have heretofore caused overburning of certain parts of the material and underburning of other parts thereof. A ring cannot form in a kiln of the character described and accordingly in operating with such a kiln, no time is lost in stopping and cooling the kiln to permit of the removal of the ring formation or clogging therein.

Having thus fully described the invention, what I claim as new and desire to secure by Letters Patent is:

1. A cement burning apparatus embodying an inclined kiln mounted for rotation, said kiln being cylindrical and of a uniform interior diameter for the major portion of its length from the feed end thereof and the remainder of its length being of circular frusto conical shape diverging toward the discharge end of the kiln which is unobstructed so that material traveling down the frusto conical portion of the kiln will not be arrested but flow freely from the discharge end thereof.

2. A cement burning apparatus embodying an inclined kiln mounted for rotation, said kiln being cylindrical and of a uniform interior diameter for the major portion of its length from the feed end thereof and the remainder of its length being of circular frusto conical shape diverging toward the discharge end of the kiln which is unobstructed so that material traveling down the frusto conical portion of the kiln will not be arrested but flow freely from the discharge end thereof, and a lining for the kiln, said lining being of greater thickness within the frusto conical portion of the kiln than within the cylindrical portion of the kiln.

3. A cement burning apparatus embodying a tubular kiln mounted for rotation on an inclined axis and having an unobstructed discharge end, said kiln being of uniform interior diameter for the greater portion of its length from the charging end of the kiln, so that material will travel through such portion at a relatively slow speed, and the kiln being frusto conical for the remainder of its length so that the material upon entering the frusto conical portion will increase in speed of travel and be unobstructedly discharged from the discharge end thereof.

4. A cement burning apparatus embodying a tubular kiln mounted for rotation on an inclined axis and having an unobstructed discharge end, said kiln being of uniform interior diameter for the greater portion of its length from the charging end of the kiln, so that material will travel through such portion at a relatively slow speed, and said kiln being frusto conical for the remainder of its length so that the material, upon entering the frusto conical portion, will increase in speed of travel and be unobstructedly discharged from the discharge end thereof, and a refractory lining within the kiln.

5. A cement burning apparatus embodying a rotating refractory lined metal tubular kiln mounted to rotate on an inclined axis and having an unobstructed discharge end, means for introducing material to be treated into the feed end of the kiln, means for applying heat within the other end of the kiln, whereby the kiln is divided into drying, calcining and burning zones, said kiln being of substantially uniform diameter throughout the drying and calcining zones, and a frusto conical interior form at the burning zone, whereby material passing through the kiln will travel at a relatively slow speed during its passage through the drying and calcining zones and at an increased speed during its passage through the burning zone.

In testimony whereof, I have signed the foregoing specification.

SYLVESTER S. McGRATH.